July 25, 1961
W. P. O'BRIEN
2,993,655
HOSE NOZZLE
Filed March 16, 1959
2 Sheets-Sheet 2
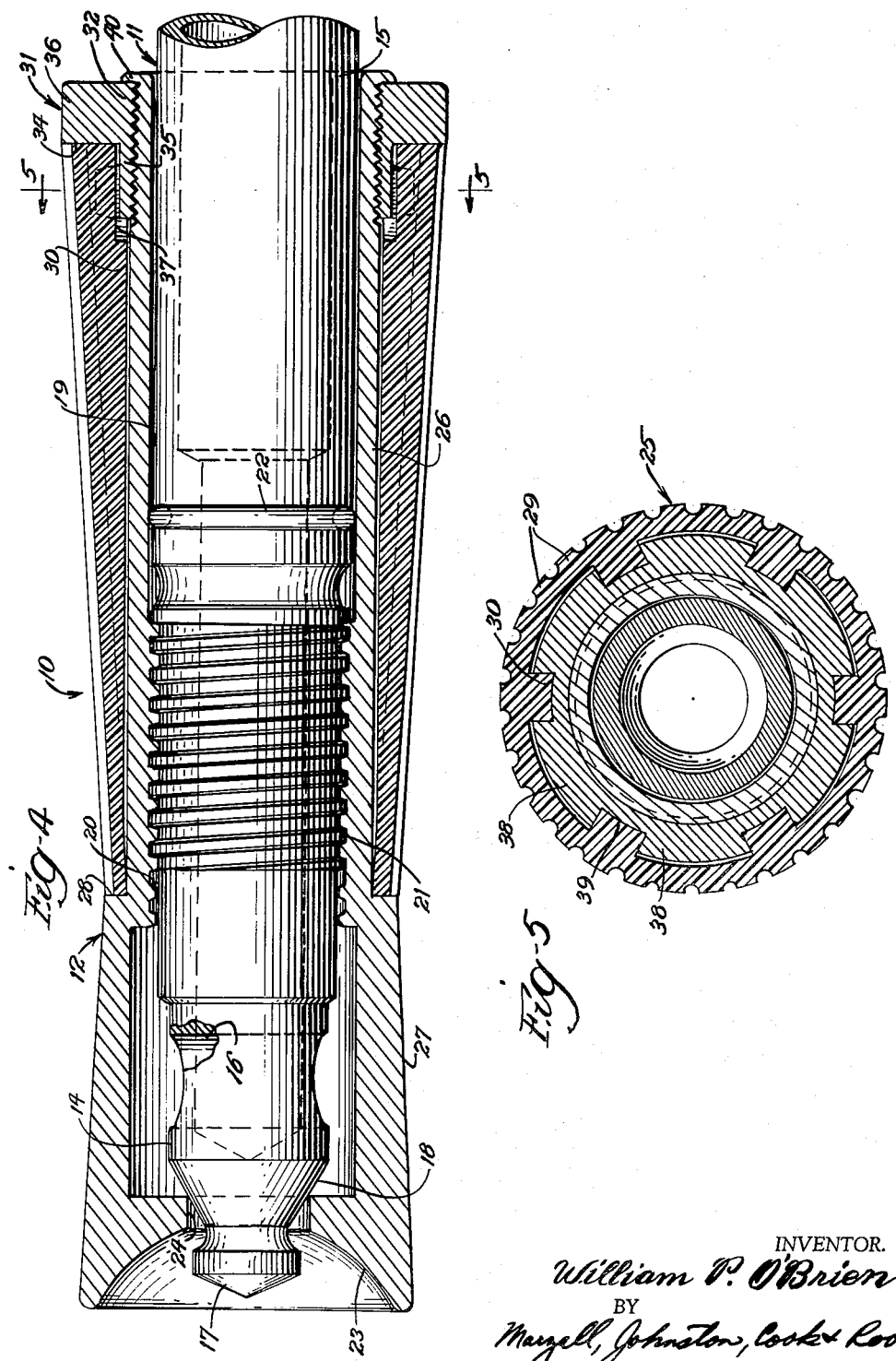
INVENTOR.
William P. O'Brien
BY
Marzall, Johnston, Cook & Root
Attys.

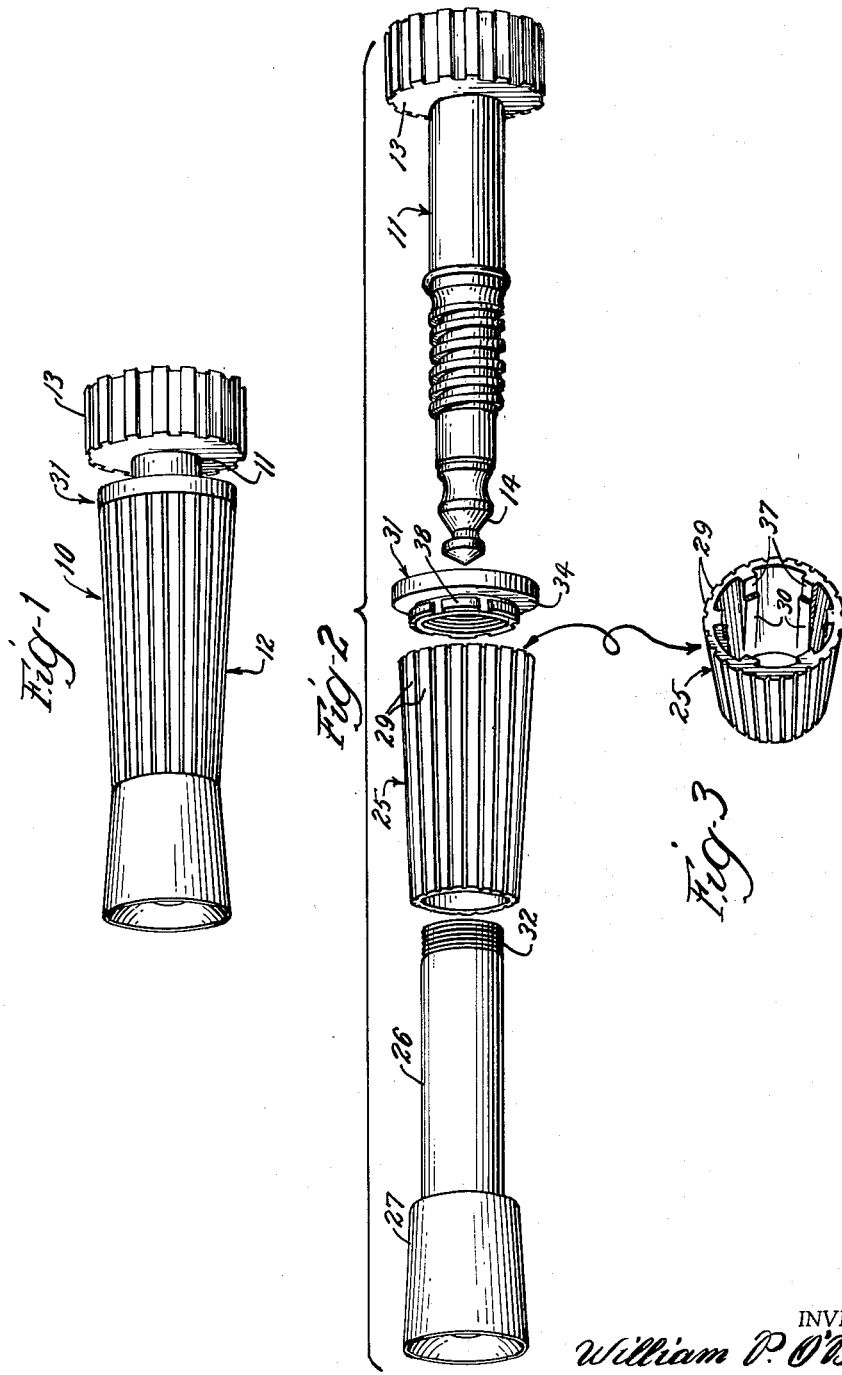

United States Patent Office 2,993,655
Patented July 25, 1961

2,993,655
HOSE NOZZLE
William P. O'Brien, Western Springs, Ill., assignor to W. D. Allen Manufacturing Co., Chicago, Ill., a corporation of Illinois
Filed Mar. 16, 1959, Ser. No. 799,725
6 Claims. (Cl. 239—582)

This invention relates to hose nozzles, and more particularly to hose nozzles adapted to be used in connection with garden hose, and still more particularly to an adjustable hose nozzle having a plastic sleeve carried on the nozzle head.

The hose nozzle of the present invention includes a body portion having a nut or coupling member at one end for attachment to a garden hose and a spray stem at the other end. A nozzle head is telescopically received over the spray stem and threadedly carried thereby for axial movement therealong during adjusting the spray discharge. A plastic sleeve is carried on the nozzle head with an outer roughened surface to enhance gripping thereof. Means is provided for securing the plastic sleeve to the nozzle head and preventing relative axial or rotatable movement therewith.

Accordingly, it is an object of this invention to provide an adjustable hose nozzle having a nozzle head with means for enhancing gripping thereof.

Another object of this invention resides in the provision of a hose nozzle including a body portion with a nut or coupling member and spray head, and a nozzle head telescopically received by the body portion, wherein a plastic sleeve is mounted on the nozzle head to enhance the gripping thereof.

Still another object of this invention is in the provision of a hose nozzle having a nozzle head with a plastic sleeve carried thereon, wherein means is provided for locking the sleeve to the nozzle head and preventing relative rotation therebetween.

A further object of this invention is to provide a hose nozzle including a nozzle head having a molded plastic sleeve secured thereto against relative axial and rotational movement therewith, wherein a locking member is provided to lock the sleeve to the nozzle head.

Other objects, features, and advantages of the invention will be apparent from the following detailed disclosure, taken in conjunction with the accompanying sheets of drawings, wherein like reference numerals refer to like parts, in which:

FIG. 1 is a perspective view of the hose nozzle according to the invention;

FIG. 2 is an exploded perspective view of the hose nozzle of FIG. 1;

FIG. 3 is a perspective view of the plastic sleeve employed in the present invention, looking into one end thereof;

FIG. 4 is an enlarged axial sectional view of the hose nozzle according to the invention, with some parts shown in elevation; and FIG. 5 is a transverse sectional view taken substantially along line 5—5 of FIG. 4.

The adjustable hose nozzle of the present invention is generally useful in connection with garden hose, although it may be used for any other suitable purpose. Referring now to the drawings, the hose nozzle of the present invention, generally designated by the numeral 10, includes generally an inner tubular member or body portion 11 and an outer tubular member or nozzle head 12.

The inner tubular member 11 includes a hose coupling nut or member 13 on one end thereof for facilitating connection to a hose or the like, and a spray stem 14 at the other end thereof. As seen in FIG. 4, a longitudinal bore 15 extends through the body portion 11 and communicates with a transversely extending bore 16 adjacent the other end in the spray stem. The spray stem also includes at the outer end a head 17 and spaced inwardly therefrom a conically formed valve surface 18.

The outer tubular member or nozzle head includes a longitudinal bore 19, FIG. 4, threaded at 20 to engage external threading 21 on the body portion 11, whereby relative rotation between the body portion and nozzle head effects axial movement therebetween. In order to prevent leakage along the external surface of the body portion and the internal surface of the nozzle head, an annular groove is formed in the internal surface of the body portion to receive a flexible O ring gasket 22. Preferably, this gasket is made of neoprene.

A relatively convex surface 23 is formed at the outer end of the nozzle head to coact with the spray stem for defining a conical stream or spray when the spray stem is relatively adjusted thereto. A shutoff ring or valve seat 24 is spaced inwardly from the outer end of the nozzle head and coacts with the valving surface 18 on the spray stem to define a shutoff valve. Thus, when the nozzle head 12 has been rotated and moved longitudinally along the body portion 11 so that the valving surface 18 engages the valve seat 24, no water or liquid will then be discharged from the hose nozzle. The nozzle head may be adjusted along the body portion in order to effect fine sprays, drenching streams, or leakproof shutoff.

In order to enhance the gripping of the nozzle head when adjusting the hose nozzle, a sleeve having an outer roughened surface and generally designated by the numeral 25 is mounted on the nozzle head. This sleeve is formed by molding same from plastic of any suitable color. Thus, a molded plastic sleeve is mounted on the exterior of the nozzle head.

The exterior surface of the nozzle head, as seen in FIG. 2, includes a pair of stepped diametrical portions 26 and 27 defining therebetween an annular shoulder 28, FIG. 4. The diametrical portion 26 is cylindrically formed, while the diametrical portion 27 is conically formed. The largest diameter of the conical surface 27 is at the outer free end of the nozzle head.

The outer surface of the molded plastic sleeve 25 is conically formed with the smaller diametrical end abutting the shoulder 28, and being fixed substantially equal to the smaller diameter of the conical surface 27. Additionally, the outer surface of the plastic sleeve 25 is provided with a plurality of circumferentially spaced and longitudinally extending projections or ridges 29 which define the roughened surface for enhancing the gripping of the nozzle head. The entire wall of the plastic sleeve is of substantially uniform thickness, and a plurality of radially extending and circumferentially spaced ribs or projections 30 are provided along the internal surface of the sleeve. These ribs are formed integrally with the body of the sleeve and vary in thickness from one end of the sleeve to the other end. The ends of the ribs adjacent the smaller diametrical end of the sleeve blend into the internal surface thereof, while the other ends of the ribs project toward the outer cylindrical surface 26 of the nozzle head and in closely spaced relationship therewith. Accordingly, the ribs function to hold the plastic sleeve in guided concentric relationship to the nozzle head.

The plastic sleeve 25 is rigidly secured to the nozzle head against relative axial and rotational movement by a locking ring or nut 31. This nut is internally threaded at 32 to coact with external threading 33 on the inlet end of the nozzle head. An annular shoulder 34 is defined on the locking nut by stepped cylindrical portions 35 and 36. The cylindrical portion 36 is diametrically sized to be substantially equal to the larger diametrical end of the plastic sleeve, as seen in FIG. 4.

The ends of the ribs 30 are cut away or notched at 37 to define with the outer cylindrical surface 26 a groove for receiving the cylindrical portion 35, FIG. 4. A plurality of circumferentially arranged lugs 38 are integrally formed on the external surface of the cylindrical portion 35 of the locking nut 31 to define therebetween slots 39 for receiving the ribs 30 of the plastic sleeve, FIGS. 4 and 5. Accordingly, the lugs 38 are received between the ribs 30 of the plastic sleeve. The coaction between the lugs 38 on the locking nut and the ribs 39 on the plastic sleeve lock the nut and sleeve together. When the locking nut 31 is tightly threaded on the threaded end of the nozzle head, the plastic sleeve is sandwiched between the angular shoulders 28 and 34, thereby functionally holding the sleeve relative to the main part of the nozzle head. In order to prevent loosening of the locking nut and removal therefrom, the inner end of the externally threaded portion 33 is turned over the outer end of the locking nut 31 as at 40, FIG. 4, by spinning or swedging. Thus a rigid structure is provided securely locking the plastic sleeve over the nozzle head.

It will be understood that modifications and variations may be effected without departing from the scope of the novel concepts of the present invention, but it is understood that this application is to be limited only by the scope of the appended claims.

The invention is hereby claimed as follows:

1. In a hose nozzle having an inner tubular member with a hose coupling member on one end and a spray stem on the other end, an outer tubular member telescopically carried on said inner member and having a portion coacting with the spray stem for regulating the stream, said members having threaded means whereby relative rotation thereof causes relative axial movement thereof, the improvement of means on said outer tubular member enhancing the gripping thereof including a molded plastic sleeve having externally arranged ribs, internally arranged projections on said sleeve, and means engaging said projections and locking said sleeve to said outer tubular member against rotation therewith.

2. In an adjustable hose nozzle having a body and a nozzle head threadedly carried on said body, said nozzle head having a pair of externally stepped diametrical portions defining therebetween an annular shoulder, a molded plastic sleeve received on the smaller diametrical portion and abutting at one end against said shoulder, said sleeve having a rough outer surface, internal projections on said sleeve, and means secured to said nozzle head and engaging said projections for locking the sleeve to said head against relative axial or rotational movement therewith.

3. In an adjustable hose nozzle having a body and a nozzle head threadedly carried on said body, said nozzle head having a pair of externally stepped diametrical portions defining therebetween an annular shoulder, a molded plastic sleeve received on the smaller diametrical portion and abutting at one end against said shoulder, said sleeve having an outer conically shaped roughened surface, internal projections on said sleeve, and means secured to said nozzle head and engaging said projections for locking the sleeve to said head against relative axial or rotational movement therewith.

4. In an adjustable hose nozzle having a body and a nozzle head threadedly carried on said body, said nozzle head having a pair of externally stepped diametrical portions defining therebetween an annular shoulder, a molded plastic sleeve received on the smaller diametrical portion and abutting at one end against said shoulder, said sleeve having on the outer surface thereof a plurality of longitudinally extending and circumferentially spaced ridges, the outer surfaces of the ridges passing through a conical plane, internal projections on said sleeve, and means secured to said nozzle head and engaging said projections for locking the sleeve to said head against relative axial or rotational movement therewith.

5. In an adjustable hose nozzle having a body and a nozzle head threadedly carried on said body, said nozzle head having a pair of externally stepped diametrical portions defining therebetween an annular shoulder, a molded plastic sleeve received on the smaller diametrical portion and abutting at one end against said shoulder, said sleeve having a rough outer surface, internal projections on said sleeve, and a locking nut secured to said nozzle head having lugs engaging said projections for locking said sleeve to said head against relative rotational movement therewith.

6. In an adjustable hose nozzle having a body and a nozzle head threadedly carried on said body, said nozzle head having a pair of externally stepped diametrical portions defining therebetween an annular shoulder, a molded plastic sleeve received on the smaller diametrical portion and abutting at one end against said shoulder, said sleeve having a rough outer surface, internal projections on said sleeve, and a locking nut secured to said nozzle head having lugs engaging said projections for locking said sleeve to said head against relative rotational movement therewith, said locking nut having an annular shoulder for engaging the other end of the sleeve to prevent axial movement of the sleeve along the nozzle head.

References Cited in the file of this patent

UNITED STATES PATENTS

| 549,637 | Gross | Nov. 12, 1895 |
| 776,391 | Giese | Nov. 29, 1904 |
| 1,496,338 | Haley | June 3, 1924 |
| 1,822,887 | Hagstedt | Sept. 15, 1931 |
| 1,851,992 | Smith | Apr. 5, 1932 |
| 1,852,454 | Foster | Apr. 5, 1932 |
| 2,627,439 | Wornall | Feb. 3, 1953 |
| 2,783,094 | Storie | Feb. 26, 1957 |

FOREIGN PATENTS

| 341,820 | France | of 1904 |
| 756,878 | Great Britain | Sept. 12, 1956 |